United States Patent
Jean et al.

(10) Patent No.: US 7,933,167 B2
(45) Date of Patent: Apr. 26, 2011

(54) SONAR IMAGING SYSTEM WITH A SYNTHETIC APERTURE

(75) Inventors: Frederic Jean, Meounes les Montrieux (FR); Didier Charlot, Roscoff (FR); Fabien Napolitano, Saint Renan (FR)

(73) Assignee: Ixsea, Marly-le-Roi (FR)

( * ) Notice: Subject to any disclaimer, the term of this patent is extended or adjusted under 35 U.S.C. 154(b) by 305 days.

(21) Appl. No.: 12/300,864

(22) PCT Filed: May 15, 2007

(86) PCT No.: PCT/FR2007/051275
§ 371 (c)(1), (2), (4) Date: Nov. 14, 2008

(87) PCT Pub. No.: WO2007/132126
PCT Pub. Date: Nov. 22, 2007

(65) Prior Publication Data
US 2009/0175128 A1    Jul. 9, 2009

(30) Foreign Application Priority Data

May 16, 2006  (FR) .................................... 06 51762

(51) Int. Cl.
G01S 15/89   (2006.01)
G01S 7/52    (2006.01)
(52) U.S. Cl. ..................................... 367/88
(58) Field of Classification Search ............... 367/88, 367/11, 7
See application file for complete search history.

(56) References Cited

U.S. PATENT DOCUMENTS 6,304,513 B1 * 10/2001 Billon ........................ 367/88
2009/0175128 A1 * 7/2009 Jean et al. .................. 367/88

FOREIGN PATENT DOCUMENTS

FR        2769372 A1 *  4/1999
WO   WO 2007132126 A1 * 11/2007

OTHER PUBLICATIONS

Hansen, R.E. et al., "Signal processing for AUV based interferometric synthetic aperture sonar", *Oceans 2003*. MTS/IEEE Proceedings. Celebrating the Past, Teaming Toward the Future, San Diego, CA, Sep. 22-26, 2003, Oceans MTS/IEEE Conference Proceedings, Columbia, MD: Marine Techn. Soc. US, vol. 5 of 5, Sep. 22, 2003, pp. 2438-2444, XP010694872.

(Continued)

*Primary Examiner* — Dan Pihulic
(74) *Attorney, Agent, or Firm* — Young & Thompson

(57) ABSTRACT

A synthetic antenna sonar system, includes:
- a sonar provided with emission elements and reception elements, the reception elements including a composite physical antenna having N transducers, the sonar being located on a mobile carrier;
- an inertial unit arranged on the carrier and suitable for measuring instantaneous position and orientation informations of the carrier;
- a common clock supplying a temporal signal enabling the synchronization of both the inertial unit and the sonar;
- elements for determining the instantaneous speed of the carrier, the determined speed feeding the inertial unit to correct the drift thereof; and
- micronavigation elements enabling an image of the seafloor to be obtained through formation of the synthetic antenna channels from K sonar operation recurrences, considering that the physical antenna movement during the carrier displacement is fully known from the informations measured by the inertial unit.

21 Claims, 3 Drawing Sheets

OTHER PUBLICATIONS

Huang, Y. et al., "Synthetic aperture sonar movement stimation—the adaptive Kalman filter approach", Neural Networks and Signal Processing, 2003. Proceedings of the 2003International Conf. on Nanjing, China, Dec. 14-17, 2003, Piscataway, NJ, USA, *IEEE*, vol. 1, Dec. 14, 2003, pp. 830-833, XP010692969.

Griffiths, H.D. et al., "Interferometric synthetic aperture sonar for high-resolution 3-D mapping of the seabed", *IEE Proceedings: Radar, Sonar & Navigation*, Institution of Electrical Engineers, GB, vol. 144, No. 2, Apr. 7, 1997, pp. 96-103, XP006008904.

Jalving, B. et al., "A toolbox of aiding techniques for the HUGIN AUV integrated inertial navigation system", Oceans 2003, MTS/IEEE Proceedings. Celebrating the Past, Teaming Toward the Future, San Diego, CA, Sep. 22-26, 2003, Oceans MTS/IEEE Conference Proceedings, Columbia, MD: Marine Techn. Soc., US, vol. 5 of 5, Sep. 22, 2003, pp. 1146-1153, XP010694712.

\* cited by examiner

SONAR IMAGING SYSTEM WITH A SYNTHETIC APERTURE

The invention relates to synthetic antenna sonar systems and the operation thereof.

The resolution of conventional sonar at a given range depends on the antenna length. So, in a first time, the antenna linear dimension has been increased to improve sonar resolution.

Then, as the dimensions of the transducers cannot increase accordingly, composite physical antennas consisting of a linear array of N transducers have been proposed.

Finally, designing of new calculating and signal processing means has enabled so-called "synthetic antennas" to be developed.

A sonar device is used, for example, as a lateral sonar. The composite antenna is then located on one of the flanks of the fish or carrier, which is submerged so as to take an image of the seafloor. The carrier can be self-propelled, but is preferably towed by a surface ship. The carrier is moved along a longitudinal direction Y substantially parallel to the antenna linear direction. The lateral sonar has thus an observation direction perpendicular to direction Y.

The synthetic antenna principle consists in using the signals received by the different transducers of the physical antenna that operate as receivers at K instants and thus at K successive locations. As schematically shown in FIG. 1, a suitable signal processing allows gradual reconstruction of an antenna the linear dimension of which can be large. The resolution obtained with a synthetic antenna corresponds to that of a conventional antenna having a length similar to the length covered during the K different successive recurrences required for data acquisition.

More precisely, to form the channels of a synthetic antenna, the K×N signals supplied by the N transducers during K successive recurrences are linearly combined. A recurrence corresponds to a time interval starting with emission of an acoustical signal during a short emission-duration, followed with reception of the corresponding echo. The linear coefficients of this combination correspond to lags or phase shifts due, on the one hand, to the different sensor locations along the antenna and, on the other hand, to the antenna relative position changing in relation to the object to be detected, i.e. the echo source.

In the simple case of a perfectly rectilinear and uniform movement of the carrier, and thus of the antenna, these lags are known. In reality, the carrier moves a lot and in a random manner. Positions of the transmitting and receiving transducers during the K acquisition recurrences are thus not precisely known. Consequently, the geometry of the antenna to be synthesized is imprecise.

Thus, the precision of such a synthetic antenna sonar is limited by the antenna deviations relative to a rectilinear and uniform theoretical navigation trajectory.

Different solutions have been investigated to remedy these drawbacks so as to increase the observation accuracy.

FR-2769372 starts from the statement that the accuracy required for the antenna position measuring is out of reach of an inertial unit (INS) because the error on the spatial position measure of the ship fitted therewith is too great.

To avoid using an INS, FR-2769372 points out development of so-called "self-focusing" methods which allow to obtain, among other things, the antenna position from a processing of the different measuring signals. It is to be noticed that in the particular self-focusing method described in U.S. Pat. No. 4,244,036, accuracy of the antenna rotation angle between two recurrences is the factor that limits method accuracy.

To overcome this difficulty, FR-2769372 proposes to correct the effects due to angular variations of the antenna using a gyrometer and measuring the reception signal elevation angle by means of an auxiliary antenna perpendicular to the main composite antenna.

Consequently, the invention aims to propose another synthetic antenna sonar system enabling an improved resolution to be achieved using a synthetic antenna.

To this end, an object of the invention is a synthetic antenna sonar system comprising: a sonar provided with emission means and reception means, the reception means comprising a composite physical antenna having N transducers, the sonar being located on a mobile carrier; an inertial unit arranged on the carrier and suitable for measuring instantaneous position and orientation informations of the carrier; and a clock.

The sonar system according to the invention is characterized in that the clock is a common clock supplying a temporal signal enabling the synchronization of both the inertial unit and the sonar, and in that the sonar system also comprises: means for determining the instantaneous speed of the carrier, wherein the determined speed feeds the inertial unit to correct the drift thereof; and micronavigation means enabling an image of the seafloor to be obtained through formation of the synthetic antenna channels from K sonar operation recurrences, considering that the physical antenna movement during the carrier displacement is fully known from the informations measured by the inertial unit.

Preferably, the micronavigation means also enable bathymetric information of the seafloor to be obtained.

In a preferred embodiment, the micronavigation means being first micronavigation means, the sonar system further comprises second micronavigation means enabling calculation of instantaneous displacement and orientation informations of the physical antenna.

Preferably, the second micronavigation means use a self-focusing method for calculation of the instantaneous position and orientation informations of the physical antenna.

Still preferably, the second micronavigation means are used as means for determining the instantaneous speed of the carrier, wherein the determined speed that feeds the inertial unit is deduced from informations calculated by the second micronavigation means.

In another embodiment, the speed determining means consist of a log, for example a Doppler log, suitable for providing a measured instantaneous speed as the determined speed.

Preferably, the micronavigation means operate in real time.

In a particular embodiment, with the physical antenna having a length of 2 m and consisting of N transducers operating in reception and the emission means generating an acoustic signal with a frequency of about 100 kHz, the sonar enables an image with a resolution of the order of 15 cm at a range of 300 m to be obtained.

Another object of the invention is a carrier intended to be moved along the longitudinal direction thereof and comprising, on each flank thereof, a sonar system according to the invention.

Still another object of the invention is a method of forming a synthetic antenna through the use of a sonar system comprising a composite physical antenna having N transducers, the sonar being located on a carrier movable in a displacement direction; an inertial unit arranged on said carrier; and a clock.

The method according to the invention is characterized in that it consists in: determining an instantaneous speed of the carrier; correcting a drift of the unit by feeding the latter with the determined instantaneous speed; synchronizing the unit and the sonar by means of a clock signal supplied by the clock, which is used as a master clock; a step of K insonifications of an area to be imaged; a step of K receptions of the N electric signals produced by each of the physical antenna transducers; a step of measuring instantaneous position and orientation informations of the carrier by means of the unit; a micronavigation step consisting in forming the synthetic antenna channels by correlating the K×N signals, considering that the physical antenna movement is known from the informations measured by the inertial unit.

Preferably, the method comprises a step of forming an image among an image with shadows and echoes and a bathymetric image, using the data obtained following formation of the synthetic antenna during the micronavigation step.

Still preferably, the micronavigation step being a first micronavigation step, the method further comprises a second micronavigation step consisting in forming the synthetic antenna channels by correlating the K×N signals without knowing a priori the physical antenna movement, the second micronavigation step enabling, among other things, calculation of instantaneous position and orientation informations of the physical antenna.

Preferably, the second micronavigation step implements a self-focusing method.

Preferably, an instantaneous speed of the carrier is determined from informations determined during the second micronavigation step, the so determined speed feeding the unit to correct the drift thereof.

Still preferably, at least one step among the first micronavigation, second micronavigation and image forming steps is carried out in real time.

The invention will be better understood and other purposes, details, features and advantages thereof will become more clearly apparent from the description of a particular embodiment of the invention which is given merely by way of illustrative and non-limitative example with reference to the appended drawing. In these drawings:

FIG. 1 schematically shows, on the left, a composite physical antenna, and on the right, the general principle of a synthetic antenna achieved through displacement of the physical antenna;

FIG. 2 shows the physical architecture of the sonar system according to the invention;

FIG. 3 schematically shows the composite physical antenna positions at two successive recurrences k and k+1;

Figure 1A:
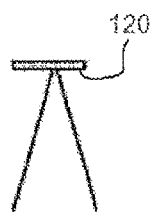
Figure 1B:
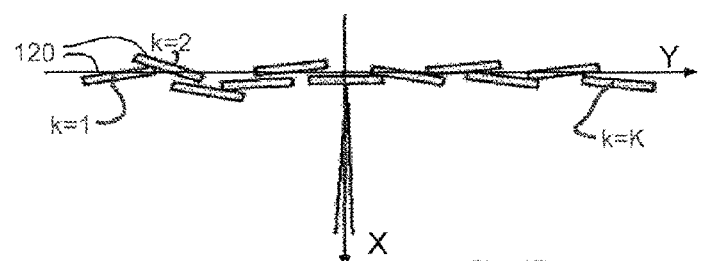
Figure 2:
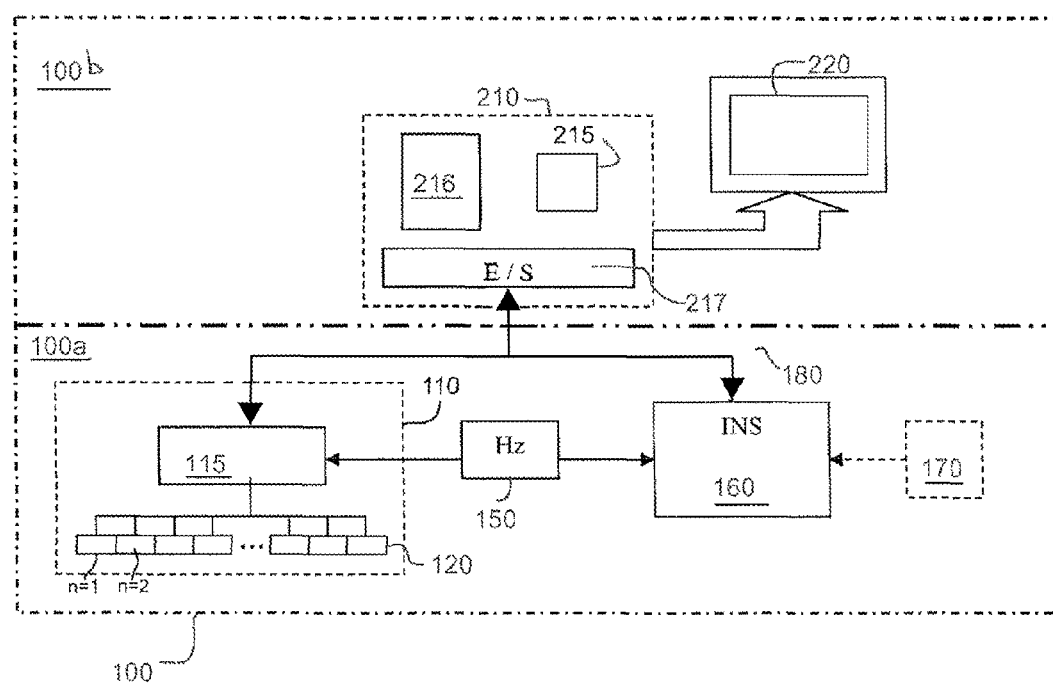

The sonar system according to the invention is schematically shown in FIG. 2. Sonar system 100 comprises a portion 100a intended to be submerged and which is located on the carrier, and a portion 100b intended to be on board of the surface ship. Portions 100a and 100b of sonar system 100 communicate with each other via suitable electrical wires.

The submerged portion 100a comprises a sonar 110 provided with an antenna 120 consisting of N transducers operating in reception and N' transducers operating in emission. Sonar 110 comprises electronics 115 adapted to periodically emit the desired acoustic signal and receive the temporal signals of each of the transducers operating as receivers. If electronics enables a rapid switch from the emission function to the reception function, a same transducer may be used for these two functions.

Electronics 115 also enables a communication with portion 110b of sonar system 100.

Portion 100a also comprises an inertial unit (INS) 160. For example, inertial unit 160 can be the "Phins" inertial unit of the IXSEA Company, with a sampling period of 10 ms. The operation of an inertial unit is well known and does not need to be detailed herein. Unit 160 provided with suitable sensors measures the carrier movement and supplies measured instantaneous position and orientation informations of the carrier at each instant of time. Angles accuracy is of the order of 0.01°.

Sonar system 100 also comprises a common clock 150. For example, the clock of the CMAX Company, designated CFPT37, can be used. It supplies a clock signal at 40 MHz to the different components of sonar system 100 so that the whole architecture has a common time reference. In particular, the clock signal is applied to sonar 110 and unit 160. Thus, sonar 110 and INS 160 are synchronized to better than 25 nanoseconds, which allows, as will be described latter, synchronized processing of the imaging and positioning signals. In a variant, the master clock might be the internal clock of the sonar or else the clock of another component of the system. But it is preferable, as shown in FIG. 2, to add a clock with a great accuracy to clock the whole system.

Portion 100b of the sonar system comprises a calculator 210. This calculator can be a PC-type computer comprising a calculating unit or processor 215, storage means 216, such as random access memories and read only memories, as well as input and output interfaces enabling communication, on the one hand, with lower portion 100a, more particularly with sonar 110 and INS 160, and on the other hand, with peripherals such as a monitor 220 or a printer so as to visualize in images the collected and processed informations.

In operation, the carrier navigates at an average altitude relative to the seafloor, measured along vertical axis Z. In the sight plane of the lateral sonar, longitudinal direction Y corresponds to the direction of the carrier average displacement and direction X is located in a plane perpendicular to direction Y and containing direction Z.

Figure 3:
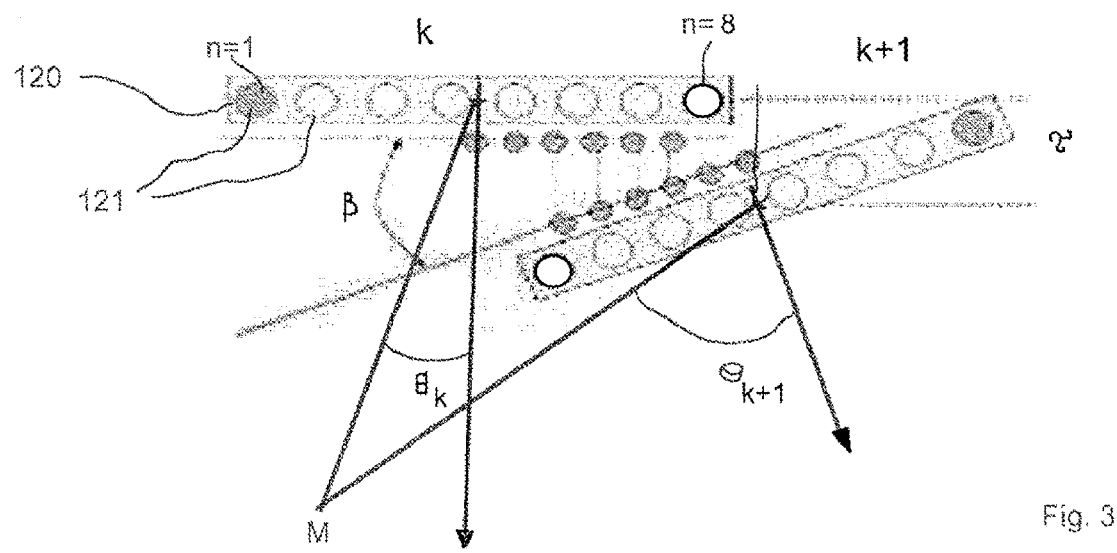

By reference to FIG. 3, the submerged carrier carries, on each flank thereof, a composite physical antenna 120 consisting of N transducers 121 operating as receivers and forming a linear array. The axis of antenna 120 merges with the carrier longitudinal axis.

Besides the N transducers used in reception, two transducers arranged at each end of antenna 120 are used as transmitters. In another embodiment, only one transducer operating as a transmitter can be arranged in the middle of the array. In still another embodiment, three transducers, two of which are arranged at each end of the antenna, operate as transmitters.

The synthetic antenna formation principle will now be described. In FIG. 3, physical antenna 120 is firstly shown at recurrence k, then at the next recurrence k+1. In the illustrated embodiment, antenna 120 comprises eight transducers 121 numbered from left to right in FIG. 2: n=1 to n=8. Transducers 121 that are arranged at the physical antenna ends (n=1 and n=8) are used in emission. The other intermediate transducers (n=2 to n=7) are used in reception.

Between two successive recurrences, the physical antenna moves. Thus, a deviation or micronavigation movement relative to the desired navigation, i.e. relative to a rectilinear and uniform trajectory, is tried to be determined. Indeed, the effects of inertia, current or the like generate fluctuations of the carrier position relative to this desired trajectory.

The movement of the antenna, which is a solid, between two successive instants is thus determined through the variation of the antenna geometrical centre position (three positional parameters) and of the antenna orientation around this geometrical centre (three angular parameters).

If the carrier actually moved along the desired trajectory, at a maximal speed of L/2, where L is the physical antenna length, there would be a very great correlation between the signals obtained on the transducers of the second half of physical antenna 120b at recurrence k and those obtained on the transducers of the first half of physical antenna 120a at recurrence k+1.

It is concluded that, conversely, if the physical antenna undergoes a micromovement between recurrences k and k+1, the additional lags to be introduced during the formation of the synthetic antenna channels, lags that enable a maximal correlation to be achieved between the transducers of the second half of the antenna at recurrence k and those of the first half of the antenna at recurrence k+1, contain information about the deviation relative to the ideal movement of the antenna.

But the additional phase shifts to be introduced come from two different contributions:
 a lag for correlating two transducers, the antenna having undergone a micromovement;
 a lag due to the fact that source M is observed under another angle between recurrences k and k+1.

Figure 4:
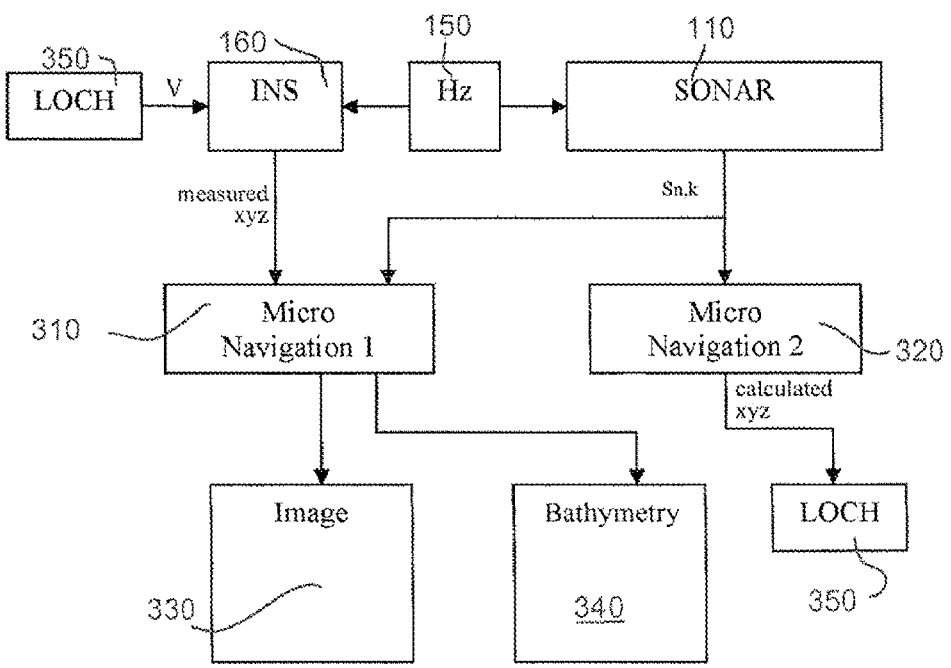
FIG. 4 is a block diagram illustrating the operation of the sonar system of FIG. 2.

By reference to FIG. 4, two techniques are implemented in the invention to evaluate and separate these contributions.

The first implemented method, called first micronavigation method 310 hereinafter, consists in using the instantaneous position and orientation informations measured by inertial unit 160 to fully determine the movement of antenna 120 between a recurrence k and the next recurrence k+1.

Once the movement of antenna 120 is known, the antenna synthesis can take place on the last K recurrences.

And the, for example coherent, synthesis of the K×N signals coming from the different transducers allows forming an image of the type shadows-and-echoes of the seafloor.

Moreover, the additional lags introduced during the formation of the channels to find the maximal coherence between the different signals are interpreted as being entirely due to the source M being observed under different angles. This mainly enables the vertical position of source M to be determined, which corresponds to a bathymetric or topographic information about the seafloor.

According to a second method, called second micronavigation method 320, signal processing methods are implemented to separate contributions due to the source from those due to the antenna movement. For example, the self-focusing method described in U.S. Pat. No. 4,244,036 can be used. It can possibly be improved using the method described in patent FR-2738918, through which phase centres of the physical antenna are shifted along the antenna between two successive recurrences to increase the correlation between these phase centres. Second micronavigation method 320 thus enables calculation of instantaneous position and orientation informations of the antenna.

In FIG. 4, the operation of sonar system 100 is shown if a block diagram form. Clock 150 periodically sends a clock signal to sonar 110 and unit 160, so that these two sub-systems are totally synchronized. At each recurrence k, the sonar emits N temporal signals $S_{n,k}$. In the same time, unit 160 supplies measures of the instantaneous position xyz(t) and of the instantaneous orientation θφψ(t).

An first micronavigation algorithm 310 implemented in the form of a software the instructions thereof are stored into storage means 216 of computer 206 is then executed by processor 215. This algorithm, using the measured position data and signals $S_{n,k}$ over a depth of K recurrences synthesizes the sonar antenna in real time.

Further, an algorithm for forming a shadows-and-echoes image 330 uses the informations obtained during the antenna synthesis during first micronavigation 310 to generate in real time a shadows-and-echoes image on screen 220.

Moreover, an algorithm for forming a bathymetric image 340 uses the informations obtained during the antenna synthesis during the first micronavigation 310 to generate in real time a bathymetric image of the seafloor.

If the real time antenna synthesis does not present a particular problem in so far as the number of calculation operations is reduced taking into account the working frequency of the processors of today's particular computers and the time available between two sonar operation recurrences, the possibility of forming images in real time is more sensitive. To this end, the known "fast factorised back projection" method (see, for example, the work entitled "Studies in High Resolution Synthetic Aperture Sonar", by S. BANKS of "University College London", 2002) has been strongly parallelized to generate an algorithm able to be executed by a computer having several processors operating in parallel. Thus, it is possible to display on the screen an image corresponding to a sliding seafloor-observation window of 1 m×600 m, at each recurrence, typically of 400 ms.

A second micronavigation algorithm 320 is also implemented in software form. Either this second micronavigation algorithm is executed on the same computer 210 as the first micronavigation algorithm 310, or this second algorithm is implemented on another computer or the like.

Second micronavigation algorithm 320 takes as input the signals $S_{n,k}$ over a depth of K recurrences to determine both contributions due to the antenna movement and contributions coming from observation of a seafloor point under an angle varying with time. Second micronavigation method 320 enables instantaneous displacement and orientation informations of the physical antenna to be generated.

In the presently preferred embodiment of the invention, the positions calculated by second micronavigation 320 are stored into a log book 350 which is used to correct the drift of inertial unit 160.

Figure 5:
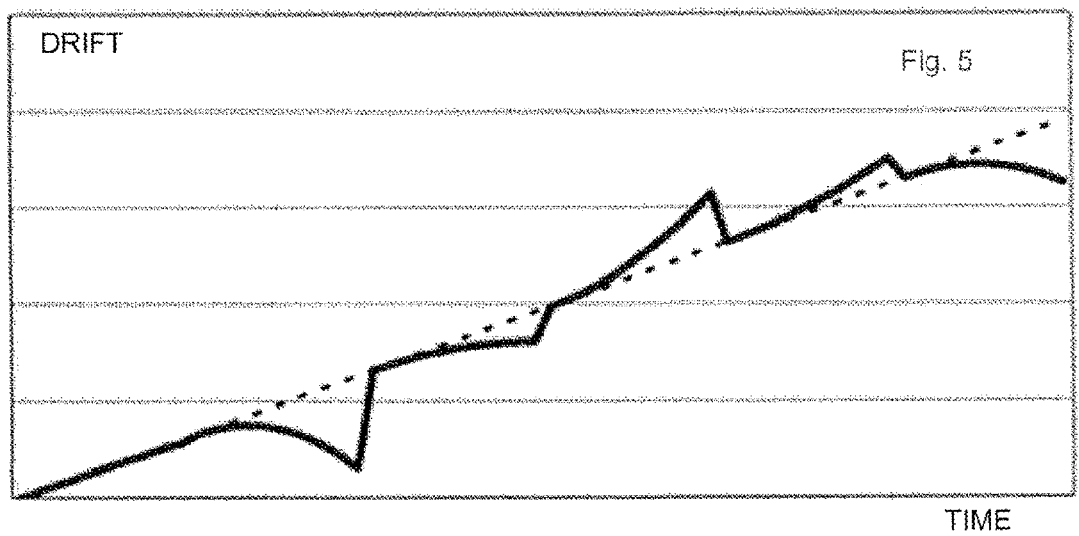
FIG. 5 is a graph indicating the correction of the INS drift with the time according to the present invention.

Indeed, to achieve a sufficient accuracy so that the informations measured by inertial unit 160 can be used into the imaging process, it is not only important that the unit and the sonar be synchronized, but also that the drift of inertial unit 160 be corrected. As shown in FIG. 5, as the inertial unit does not have any fixed landmark, the drift, which corresponds to the difference between the position measured by the inertial unit and the real position, varies according to the unit movement itself. It is thus necessary to feed the unit with speed information.

In the preferred embodiment of the system according to the invention, this speed is determined based on informations obtained from second micronavigation method 320. The speed instantaneous value enables the drift shown in solid line in FIG. 5 to be corrected.

Thanks to this correction, the drift is brought back to a linear profile, shown in broken line in FIG. 5. This linear drift behaviour of unit 160 does not affect the implementation of the first micronavigation method because the influence of that linear drift is negligible on the image quality and is much reduced on the georeferencing of this image.

Figure 6:
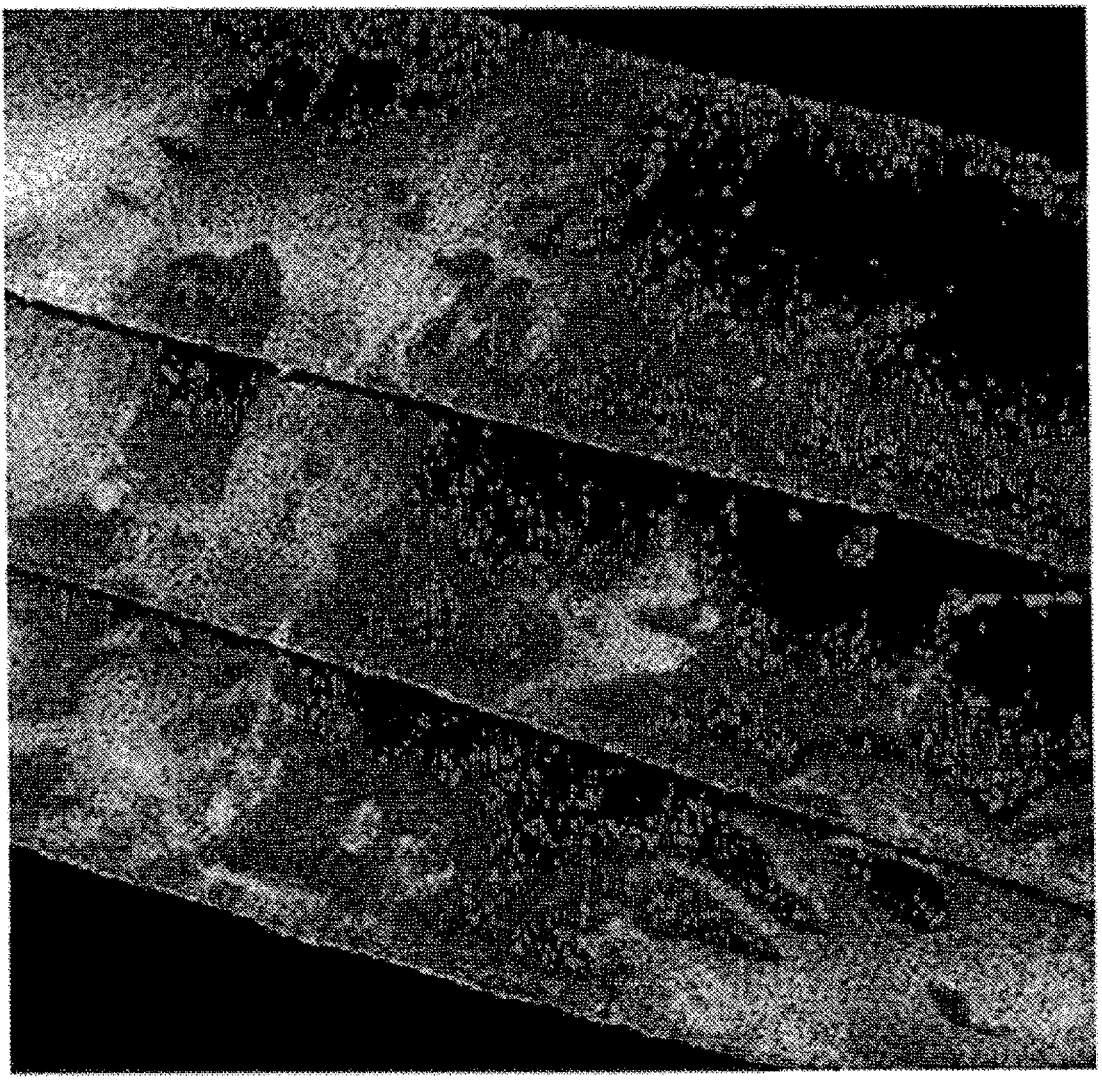
FIG. 6 is an image obtained by the sonar system according to the invention.

Finally, FIG. 6 shows an image obtained by means of the sonar system according to the invention. These are sonar images conventionally shown in grey levels. They have been obtained using a physical antenna with a length L equal to 2 m, made up of 24 transducers in reception and 3 transducers in emission. The working frequency f is of the order of about 100 kHz, to with a wavelength λ of 1.5 cm. The antenna is synthesized on the last K=15 recurrences with a displacement speed lower than a maximal linear displacement speed of the carrier of Vmax=5 knots.

Accuracy of images obtained using the sonar system according to the invention, which allows the position to be identified thanks to the INS at about λ/8 (to within a linear drift range), is of the order of 15 cm for a range R of 300 m.

In another embodiment, instead of adding a clock to synchronize the unit and sonar operations, the clock of one of these two elements may be used to supply a clock temporal signal to the other of these two elements.

Though the invention has been described above by reference to a particular embodiment, the invention is not limited to this embodiment and includes all technical equivalents to the described means as well as their combinations that are within the scope of the invention.

Thus, in a simplified embodiment, the system comprises a speed sensor 170 (in broken line in FIG. 3) feeding the unit to correct the drift thereof. Such sensor may be a Doppler sensor, an electromagnetic sensor or the like.

Such sensor can possibly be fitted on the sonar system according to the above described preferred embodiment to obtain redundant information about the carrier speed.

The invention claimed is:

1. Synthetic antenna sonar system, comprising:
    a sonar (110) provided with emission means and reception means, said reception means comprising a composite physical antenna (120) having N transducers (121), said sonar being located on a mobile carrier;
    an inertial unit (160) arranged on said carrier and suitable for measuring instantaneous position and orientation informations of said carrier; and
    a clock (150),
    characterized in that said clock is a common clock supplying a temporal signal enabling the synchronization of both the inertial unit and the sonar, and in that the sonar system also comprises:
    means for determining the instantaneous speed of said carrier (350), wherein the determined speed feeds the inertial unit to correct the drift thereof; and
    micronavigation means (310) enabling an image of the seafloor to be obtained through formation of the synthetic antenna channels from K sonar operation recurrences, considering that the physical antenna movement during the carrier displacement is fully known from the informations measured by said inertial unit.

2. The sonar system according to claim 1, characterized in that said micronavigation means (310) also enable bathymetric information of the seafloor to be obtained.

3. The sonar system according to claim 1, characterized in that said micronavigation means being first micronavigation means (310), said sonar system further comprises second micronavigation means (320) enabling calculation of instantaneous displacement and orientation informations of the physical antenna (120).

4. The sonar system according to claim 3, characterized in that said second micronavigation means (320) use a self-focusing method for calculation of the instantaneous position and orientation informations of the physical antenna (120).

5. The sonar system according to claim 3, characterized in that said second micronavigation means (320) are used as means for determining the instantaneous speed of said carrier, wherein the determined speed that feeds said inertial unit (160) is deduced from informations calculated by the second micronavigation means.

6. The sonar system according to claim 1, characterized in that said speed determining means consist of a Doppler log (350) suitable for providing a measured instantaneous speed as the determined speed.

7. The sonar system according to claim 1, characterized in that said micronavigation means (310; 320) operate in real time.

8. The sonar system according to claim 1, characterized in that, with the physical antenna (120) having a length of 2 m and consisting of N transducers (121) operating in reception and the emission means generating an acoustic signal with a frequency of about 100 kHz, said sonar (110) enables an image with a resolution of the order of 15 cm at a range of 300 m to be obtained.

9. Carrier intended to be moved along the longitudinal direction thereof, comprising, on each flank thereof, a sonar system characterized in that each of said lateral sonar systems is a sonar according to claim 1.

10. Method of forming a synthetic antenna through the use of a sonar system comprising:
    a composite physical antenna (120) having N transducers (121), said sonar (110) being located on a carrier movable in a displacement direction;
    an inertial unit (160) arranged on said carrier; and
    a clock (150),
    characterized in that said method consists in:
    determining an instantaneous speed of said carrier;
    correcting a drift of said unit by feeding the latter with said determined instantaneous speed;
    synchronizing said unit and said sonar by means of a clock signal supplied by said clock, which is used as a master clock;
    a step of K insonifications of an area to be imaged;
    a step of K receptions of the N electrical signals produced by each of said physical antenna transducers;
    a step of measuring instantaneous position and orientation informations of said carrier by means of said unit;
    a micronavigation step consisting in forming said synthetic antenna channels by correlating the K×N signals, considering that the physical antenna movement is known from the informations measured by said inertial unit.

11. The method according to claim 10, characterized in that it further comprises a step of forming an image among an image with shadows and echoes and a bathymetric image, using the data obtained following formation of the synthetic antenna during the micronavigation step.

12. The method according to claim 10, characterized in that, said micronavigation step being a first micronavigation step, the method further comprises a second micronavigation step consisting in forming said synthetic antenna channels by correlating the K×N signals without knowing a priori the movement of the physical antenna (120), said second micronavigation step enabling, among other things, calculation of instantaneous position and orientation informations of the physical antenna.

13. The method according to claim 12, characterized in that said second micronavigation step implements a self-focusing method.

14. The method according to claim 12, characterized in that an instantaneous speed of said carrier is determined from informations determined during said second micronavigation step, the so determined speed feeding said unit (160) to correct the drift thereof.

15. The method according to claim 10, characterized in that one step among the first micronavigation, second micronavigation and image forming steps is carried out in real time.

16. The sonar system according to claim 2, characterized in that said micronavigation means being first micronavigation means (310), said sonar system further comprises second micronavigation means (320) enabling calculation of instantaneous displacement and orientation informations of the physical antenna (120).

17. The sonar system according to claim 4, characterized in that said second micronavigation means (320) are used as means for determining the instantaneous speed of said carrier, wherein the determined speed that feeds said inertial unit (160) is deduced from informations calculated by the second micronavigation means.

18. The method according to claim 11, characterized in that, said micronavigation step being a first micronavigation step, the method further comprises a second micronavigation step consisting in forming said synthetic antenna channels by correlating the K×N signals without knowing a priori the movement of the physical antenna (120), said second micronavigation step enabling, among other things, calculation of instantaneous position and orientation informations of the physical antenna.

19. The method according to claim 13, characterized in that an instantaneous speed of said carrier is determined from informations determined during said second micronavigation step, the so determined speed feeding said unit (160) to correct the drift thereof.

20. The method according to claim 11, characterized in that one step among the first micronavigation, second micronavigation and image forming steps is carried out in real time.

21. The sonar system according to claim 1, wherein the temporal signal from said common clock is supplied to both said inertial unit and said sonar and has a temporal accuracy exceeding that of said inertial unit and said sonar so that the system has a common time reference.

* * * * *